United States Patent [19]

Sakai et al.

[11] Patent Number: 5,552,903
[45] Date of Patent: Sep. 3, 1996

[54] IMAGE PROCESSING APPARATUS AND IMAGE PROCESSING METHOD

[75] Inventors: Masanori Sakai, Yokohama; Kunio Yoshihara, Sagamihara; Mitsuo Nimura, Kawasaki, all of Japan

[73] Assignee: Canon Kabushiki Kaisha, Tokyo, Japan

[21] Appl. No.: 384,217

[22] Filed: Feb. 6, 1995

Related U.S. Application Data

[63] Continuation of Ser. No. 873,813, Apr. 27, 1992, abandoned.

[30] Foreign Application Priority Data

May 1, 1991 [JP] Japan ..................................... 128364

[51] Int. Cl.$^6$ ........................................... H04N 1/46
[52] U.S. Cl. ..................... 358/500; 358/538; 358/537; 358/452; 358/453; 358/462
[58] Field of Search ..................... 358/452, 453, 358/462, 500, 537, 538, 540; 355/326 R, 327, 328

[56] References Cited

U.S. PATENT DOCUMENTS

| | | | |
|---|---|---|---|
| 4,538,182 | 8/1985 | Saito et al. | 358/280 |
| 4,896,208 | 1/1990 | Moriya et al. | 358/78 |
| 4,982,277 | 1/1991 | Katoh et al. | 358/80 |
| 5,075,787 | 12/1991 | Shaughnessy et al. | 358/452 |
| 5,126,838 | 6/1992 | Ohsawa et al. | 358/500 |
| 5,168,352 | 12/1992 | Naka et al. | 358/500 X |

*Primary Examiner*—Peter S. Wong
*Assistant Examiner*—Randy W. Gibson
*Attorney, Agent, or Firm*—Fitzpatrick, Cella, Harper & Scinto

[57] ABSTRACT

An image processing apparatus includes an image input unit for inputting monochromatic image information and a recognition unit for recognizing color assigning information for assigning a color and a region in the monochromatic image information. A synthesis unit is provided for synthesizing the color in the region in the monochromatic image information according to the color assigning information recognized by the recognition unit, and an output unit outputs an image having a plurality of colors synthesized by the synthesis unit.

27 Claims, 12 Drawing Sheets

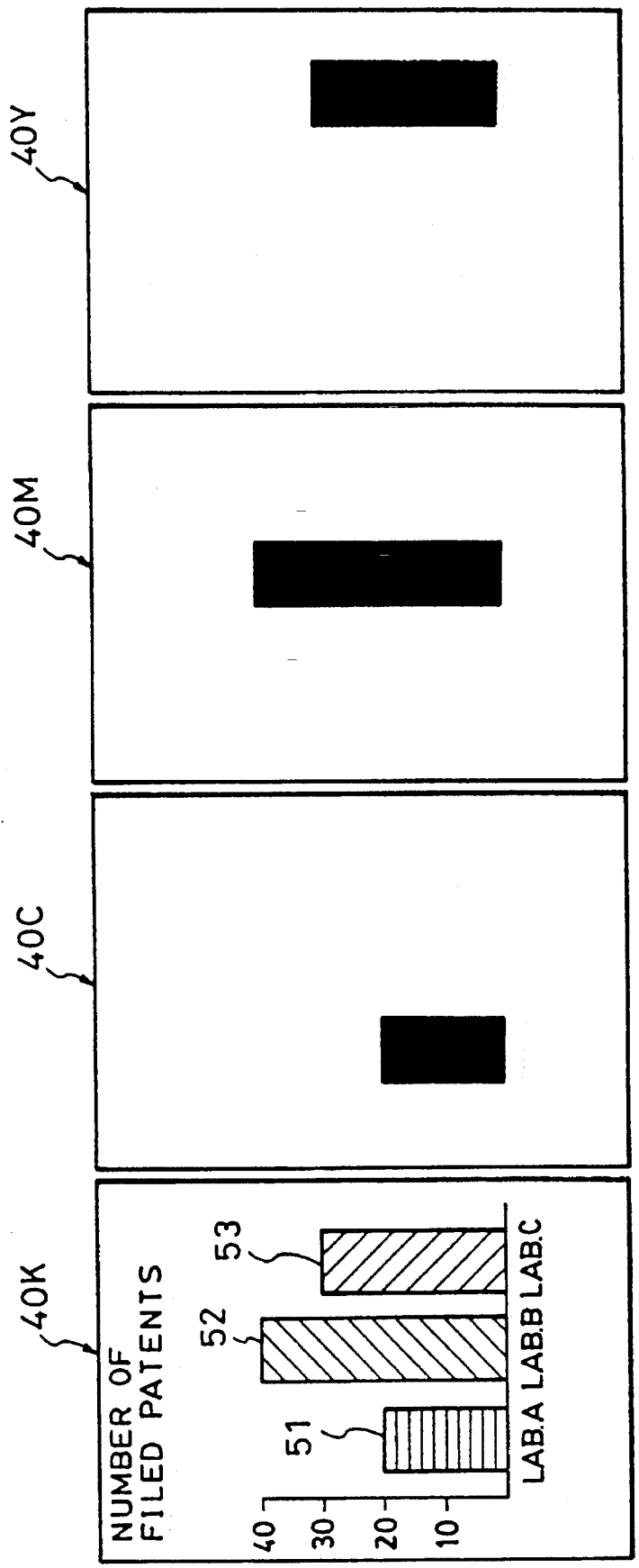

IMAGE PROCESSING APPARATUS AND IMAGE PROCESSING METHOD

This application is a continuation of application Ser. No. 07/873,813 filed Apr. 27, 1992, now abandoned.

BACKGROUND OF THE INVENTION

1. Field of the Invention

This invention relates to an image processing apparatus which synthesizes color information with image information.

2Description of the Related Art

Recently, color copiers have appeared in which an image of an original is read, a color is assigned for the read image, and the image having the assigned color is printed. In performing partial color conversion in such a color copier, an area is assigned, for example, by an attached digitizer or the like, and a color and a mode to be converted are also assigned.

In such a color copier, however, area assignment is troublesome. Particularly, if an area to be assigned has a complicated shape, area assignment may not he performed in some cases. Furthermore, color copiers which can perform such color conversion are in general expensive.

A color copier which recognizes an area surrounded by color lines on an original and paints the interior of said area, as shown in U.S. Pat. No. 4,538,182, is knows as another example. However, in order to assign an area in such a color copier, a specific color pen should be used and the edge of the area should be attentively traced with said color pen. However, such an operation is problematic. In addition, such a color copier is expensive since it requires a color sensor which recognizes color lines.

SUMMARY OF THE INVENTION

It is an object of the present invention to provide an improved image processing apparatus.

It is another object of the present invention to provide an image processing apparatus which can easily synthesize color information with image information.

It is still another object of the present invention to provide an image processing apparatus which can automatically color a monochromatic image of an original and output the resultant image.

According to an aspect of the present invention, an image processing apparatus is provided with an image input means for inputting monochromatic image information. A recognition means recognizes color assigning information for assigning a color and a region in the monochromatic image information. A synthesis means synthesizes the color in the region in the monochromatic image information according to the color assigning information recognized by the recognition means, and an output means is provided for outputting an image having a plurality of colors synthesized by the synthesis means.

According to another aspect of the present invention, an image processing apparatus comprises image input means for inputting image information. A comparison means compares the image information from the image input means with a plurality of predetermined patterns. A first image forming means performs image formation of the image information in a first color on a recording medium, and a second image forming means performing image formation in a second color on a region on the recording medium for which the comparison means determines that the image information coincides with one of the plurality of predetermined patterns.

According to a further aspect of the present invention, an image processing apparatus is provided with an image input means for inputting image information. A comparison means compares the image information from the image input means with a plurality of predetermined patterns. A first image forming means performs image formation of the image information of a first region, for which the comparison means determines that the image formation does not coincide with any of the plurality of predetermined patterns, in a first color on a recording medium. A second image forming means performs image formation in a second color on a second region on the recording medium for which the comparison means determines that the image information coincides with one of the plurality of predetermined patterns.

According to an additional aspect of the present invention, an image processing apparatus includes an image input means for inputting image information. A character recognition means recognizes characters in the image information, and a line-drawing region in the image information. An image forming means is provided for performing image formation in a plurality of colors on a recording medium. A control means controls the image forming means so that image formation of the image information is performed in a predetermined color, and a region within a line-drawing image surrounding the characters is formed in a color corresponding to the characters recognized by the character recognition means.

These and other objects and features of the present invention will become more apparent from the following detailed description of the preferred embodiments taken in connection with the accompanying drawings.

BRIEF DESCRIPTION OF THE DRAWINGS

FIGS. 6(a)–6(d) are diagrams showing an example of pattern information and color information stored in a K memory and a color information memory unit of the first embodiment;

DESCRIPTION OF THE PREFERRED EMBODIMENTS

Preferred embodiments of the present invention will now be explained in detail with reference to the drawings.

Figure 1:
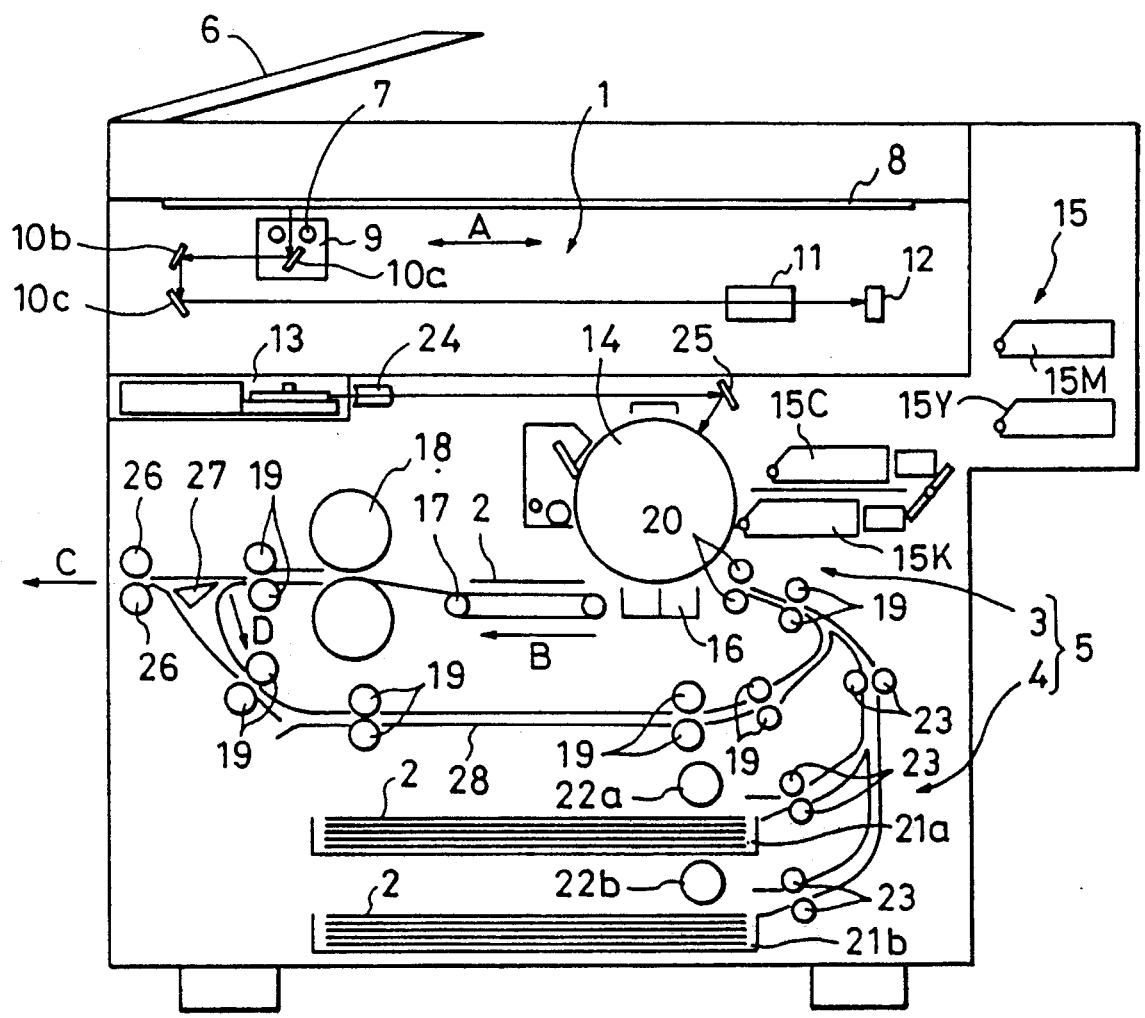
FIG. 1 is a diagram showing the internal configuration of an image forming apparatus according to a first embodiment of the present invention.

FIG. 1 is a diagram showing the internal structure of an image forming apparatus according to a first embodiment of the present invention. The image forming apparatus comprises an image information reading unit 1 for reading image information provided on an original, an image forming system 3 for forming an image on recording paper 2 according to the image information read by the image information reading unit 1, and paper feeding and conveying unit 4 for supplying the image forming system 3 with the recording paper 2. In the present embodiment, the image forming system 3 and the paper feeding and conveying unit 4 constitute a copy unit 5.

More specifically, the image information reading unit 1 comprises an original feed unit 6 on which originals comprising an appropriate number of sheets are mounted, an original conveying mechanism (not shown), a scanner unit 9 for irradiating an original mounted on original-feed-unit glass 8 by a lamp 7 while moving in the directions of two-head arrow A, a plurality of reflecting mirrors 10a, 10b and 10c, a condenser lens 11, and an image sensor 12, such as a CCD (charge-coupled device) or the like, to which the image information provided on the original is input.

The image forming system 3 comprises an exposure control unit 13 for converting the image information input to the image sensor 12 into an optical signal, a photosensitive member 14 irradiated by irradiating light from the exposure control unit 13, a developing device 15 for developing a latent image formed on the photosensitive member 14 in desired colors, a transfer unit 16 for transferring the image information onto the recording paper 2, a conveyor 17, a fixing unit 18 whose main portion comprises a pair of upper and lower drums, a plurality of pairs of conveying rollers 19, and a pair of registration rollers 20.

The developing device 15 comprises a black developing unit 15K containing black toner, a cyan developing unit 15C containing cyan (C) toner, a yellow developing unit 15Y containing yellow (Y) toner, and a magenta developing unit 15M containing magenta (M) toner. The respective units are properly set at respective predetermined positions so that an image can be developed in the respective colors. A heater is incorporated in one of the drums of the fixing unit 18, and the image is fixed by the heater.

The paper feeding and conveying unit 4 comprises paper feed cassettes 21a and 21b containing the recording paper 2, recording-paper weights 22a and 22b, and a plurality of pairs of conveying rollers 23.

In the image forming apparatus having the above-described configuration, the originals mounted on the original feed unit 6 are sequentially conveyed onto the original-mount glass 8 by the original conveying mechanism. When an original has been conveyed onto the original-mount glass 8, the lamp 7 is lit, and the scanner unit 9 moves in the direction of arrow A to irradiate the original. Light reflected by the original passes through the condenser lens 11 via the reflecting mirrors 10a–10c, and is input to the image sensor 12. Image information input to the image sensor 12 is further input to the exposure control unit 13 after being subjected to predetermined processing by an image signal control circuit (to be described later), and is converted into an optical signal. Subsequently, the image information converted into the optical signal by the exposure control unit 13 is projected onto the photosensitive member 14 via a lens 24 and a reflecting mirror 25. A latent image formed on the photosensitive member 14 by the projected light is developed by the developing device 15 in which a predetermined developing unit is set.

On the other hand, the recording paper 2 is conveyed from one of the paper feed cassettes 21a and 21b to the transfer unit 16 via the conveying rollers 23 in synchronization with the latent image on the photosensitive member 14, and the developed image is transferred onto the recording paper 2. Subsequently, the recording paper 2 is conveyed on the conveyor 17 in the direction of arrow B to the fixing unit 18, where the transferred image is fixed on the recording paper 2.

In the case of monochromatic copy, the recording paper 2 on which the image has been fixed is discharged to the outside via a pair of paper discharge rollers 26 as indicated by arrow C. In the case of multicolor copy, the recording paper 2 is conveyed in the direction of arrow D via a separating mechanism 27, passes through a lower conveying unit 28, and temporarily stops at the pair of registration rollers 20. After the image has been developed by a predetermined developing unit of the developing device, the recording paper 2 proceeds again to the transfer unit 16, where the image is transferred onto the recording paper 2. The transferred image is fixed by the fixing unit 18 to complete predetermined multicolor copying. Subsequently, the recording paper 2 is discharged to the outside via the paper discharge rollers 26 as indicated by arrow C.

Figure 2:
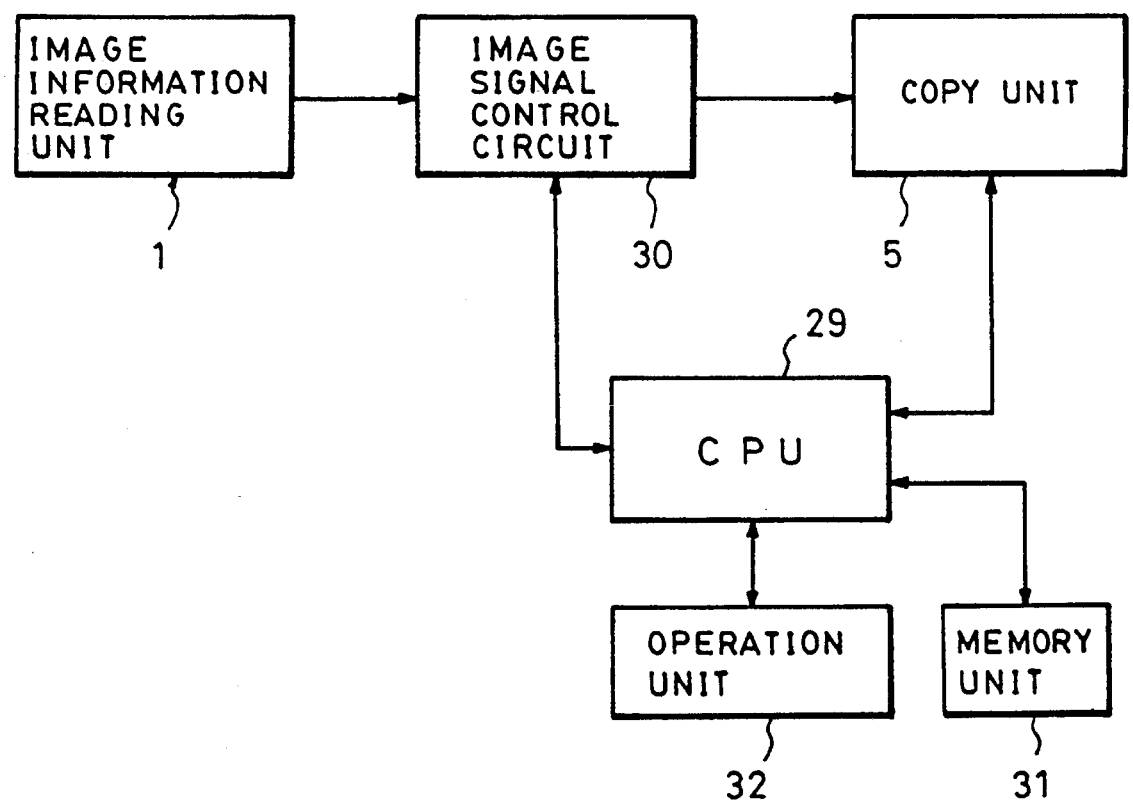
FIG. 2 is a block diagram showing the schematic configuration of the image forming apparatus shown in FIG. 1.

FIG. 2 is a block diagram of the above-described image forming apparatus.

Image information input to the image information reading unit 1 is subjected to predetermined processing by an image signal control circuit 30 controlled by a CPU (central processing unit) 29, and is output to the copy unit 5.

A memory unit 31 includes a ROM (read-only memory) region for storing predetermined control programs to be executed by the CPU 29, and a rewritable RAM (random access memory) region for performing, for example, formation of a predetermined table according to instructions from an operation unit 32 and the CPU 29.

Figure 3:
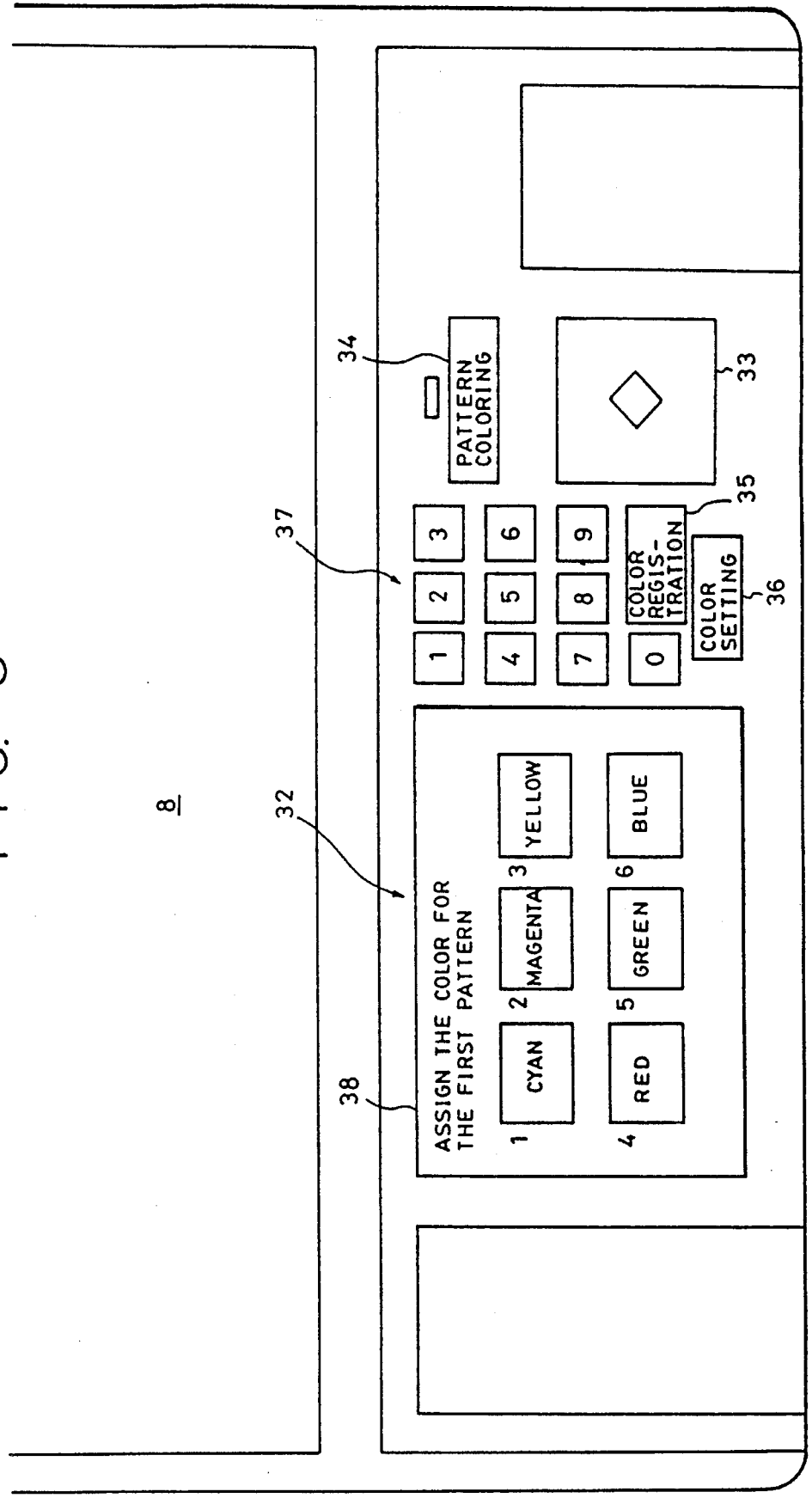
FIG. 3 is a plan view of an operation unit.

FIG. 3 is a top plan view of the operation unit 32 disposed in front of the original-mount glass 8 on the upper surface of the main body of the apparatus.

A start key 33 for driving the main body of the apparatus, a "pattern coloring" mode key 34 for performing a copying operation while providing a predetermined pattern in the image of the original with predetermined coloring, a color registration key 35 for registering a color for a predetermined pattern, a "color setting" mode key 36 for performing color registration, ten keys for performing, for example, color assignment for a pattern, and a display unit 38 comprising a liquid crystal panel (LCD) for displaying a predetermined message and the like are disposed at appropriate portions on the operation unit 32. In the present embodiment, it is possible to assign six kinds of colors by operating the ten keys 37.

Figure 4:
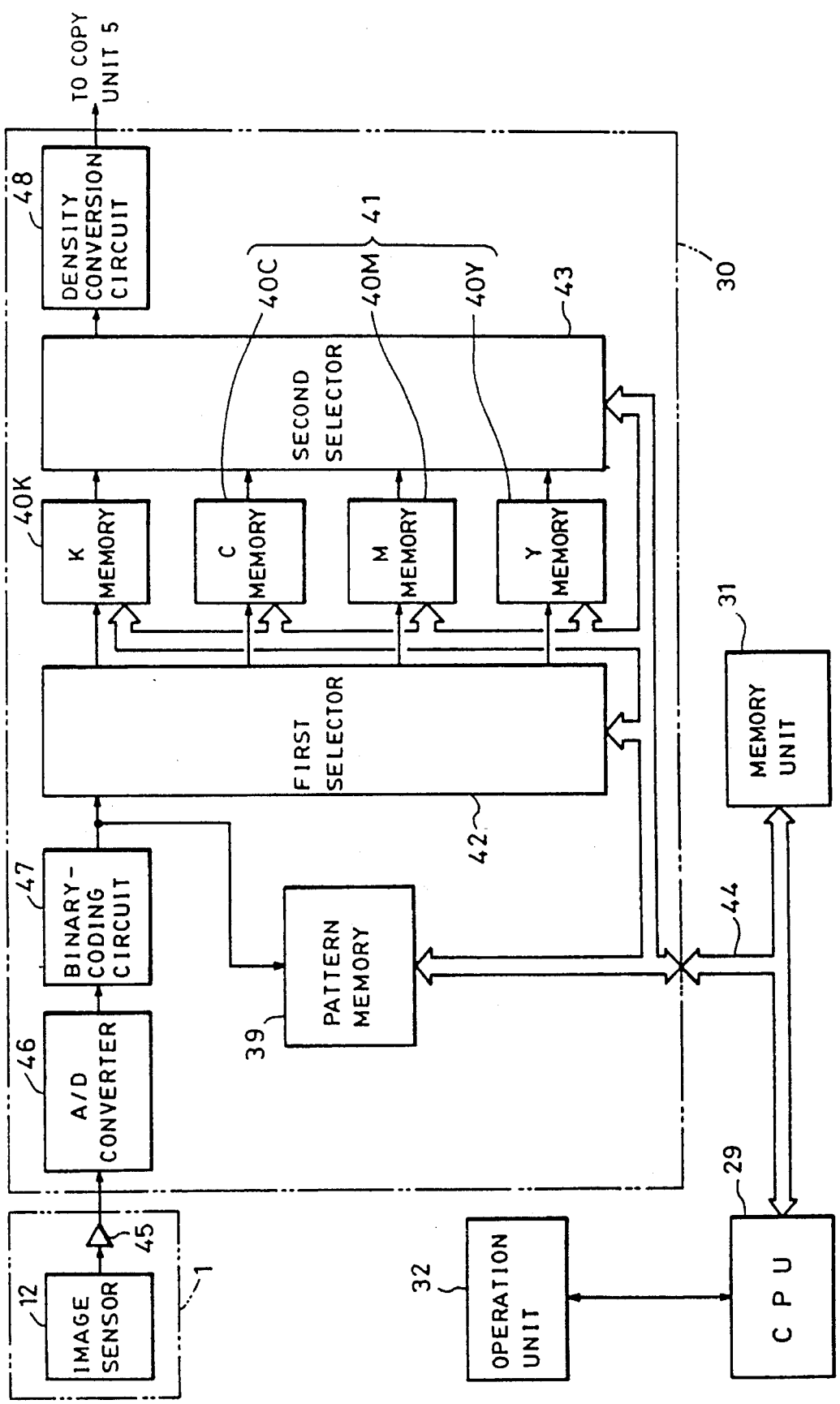
FIG. 4 is a block diagram showing the detail of FIG. 2.

More specifically, as shown in FIG. 4, the image signal control circuit 30 comprises, as principal units, a pattern memory 39 for storing predetermined image patterns, a K memory 40K for storing black image information, a color information memory unit 41 for storing color image information, a first selector 42 for identifying input image information and generating an output signal for the K memory 40K or the color information memory unit 41. A second selector 43 is provided for selecting either input information from the K memory 40K or the color information memory unit 41 and generating an output signal. The color information memory unit 41 comprises a C memory 40C for storing cyan information, an M memory 40M for storing magenta information, and a Y memory 40Y for storing yellow information. The above-described units are connected to the CPU 29 via a control bus 44, and are controlled by the CPU 29.

In performing monochromatic copying (for example, black copying), the image signal control circuit 30 operates in the following manner.

Image information subjected to photoelectric conversion by the image sensor 12, disposed in the image information reading unit 1, is input to an amplifier 45. The amplifier 45 amplifies the image signal so as to be adjusted to a predetermined input level, and outputs the amplified signal to the image signal control circuit 30.

In the image signal control circuit 30, image information in the form of an analog signal is first converted into a digital signal by an A/D converter 46, and is input to a binary-coding circuit 47, which converts multivalue image information into a binary, i.e., (0, 1), image signal.

Subsequently, the binary-coded image signal (binary signal) is input to the first selector 42. When copying is performed in black (set by operating the ten keys 37 on the operation unit 32), the CPU 29 instructs the first selector 42 to input the binary signal input to the first selector 42 to the K memory 40K via the control bus 44, and a signal output from the first selector 42 is stored in the K memory 40K. Subsequently, a reading operation from the K memory 40K is started, and the output from the K memory 40K is provided to the second selector 43.

Subsequently, the output signal from the second selector 43 is provided to a density conversion circuit 48, which inverts (1:black, 0:white) a luminance signal (1:white, 0:black). Image information is output to the copy unit 5, and an image is formed on the recording paper 2 in the same manner as described above.

In the above-described embodiment, an explanation has been provided of the case wherein black copying is performed. However, even when monochromatic copying is performed in one color such as cyan (C), magenta (M), yellow (Y) and the like, it is possible to perform monochromatic copying in a desired color by generating output signals from the first selector 42 and the second selector 43 in accordance with the selected color. That is, by inputting an output signal from the first selector 42 to the C memory 40C, the M memory 40M or the Y memory 40Y when cyan copy, magenta copy or yellow copying is performed, respectively, and providing an output signal from the color information memory unit 41 to the second selector 43, it is possible to perform monochromatic copying of the desired color.

Pattern coloring copy

In pattern coloring copying, a copying operation is performed while providing image patterns in an image of an original with desired colors.

A detailed explanation will now be provided of pattern coloring copying wherein a copying operation is performed while painting previously registered pattern portions into predetermined colors.

Figure 5A:
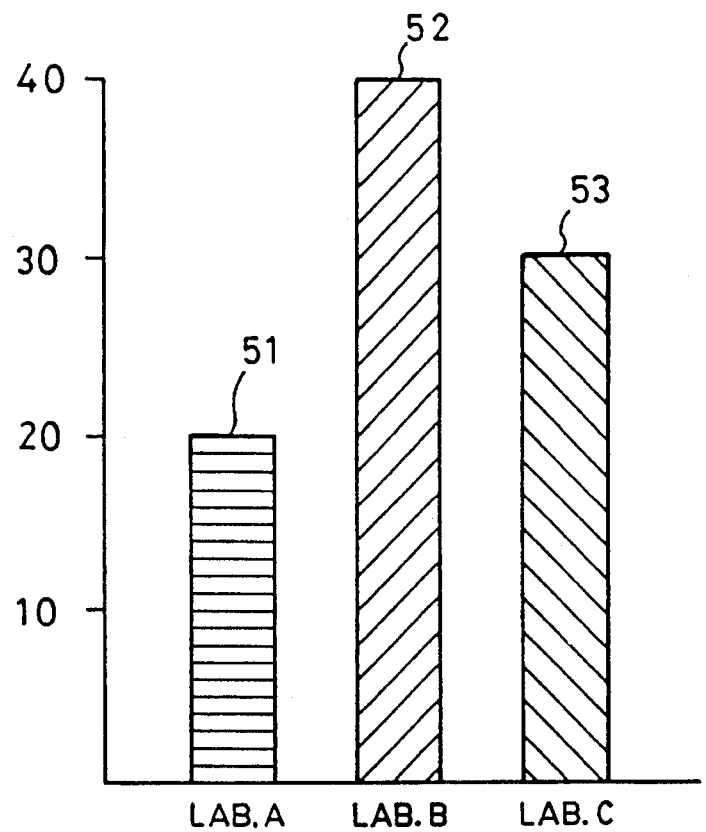
FIG. 5A is a diagram illustrating an monochromatic original.

FIG. 5A shows an original having a monochromatic image in which the numbers of filed patents by laboratories A, B and C are represented by a bar graph.

The user first sets the mode to a coloring copying mode by depressing the pattern coloring mode key 34 (see FIG. 3) on the operation unit 32, then mounts the original shown in FIG. 5A on the original-mount glass 8, and depresses the start key 33 on the operation unit 32.

When the start key 33 has been depressed, the image information reading unit 1 operates. Image information is subjected to photoelectric conversion by the image sensor 12, and is input to the amplifier 45. The image information amplified by the amplifier 45 is input to the A/D converter 46, where the image information in the form of an analog signal is converted into a digital signal, and the converted signal is input to the binary-coding circuit 47. The image information output from the binary-coding circuit 47 is input to the first selector 42 and the pattern memory 39.

Figure 5B:
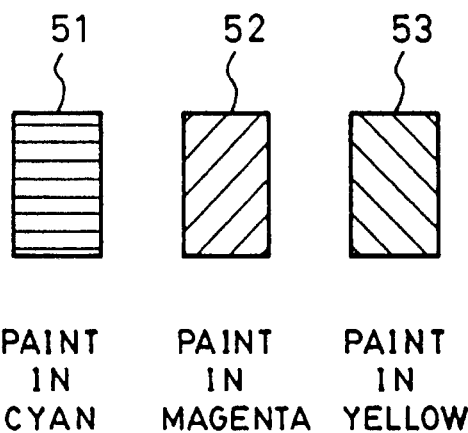
FIG. 5b is a diagram showing the correspondence of patterns with colors.

The image information input to the first selector 42 is further input to and stored in the K memory 40K without being modified. The pattern memory 39 compares the image information with preset image pattern information as shown in FIG. 5B, and detects a coincident portion. If a coincident portion has been detected, the coincident pattern information is input to the memory of the color information memory unit 41 corresponding to each image pattern.

That is, when the CPU 29 has detected a coincident portion between the image information and the pattern information, if the pattern is a first pattern 51 as shown in FIG. 6(*a*), "0" (cyan) is written in a position corresponding to the patterned portion of the C memory 40C (FIG. 6(*b*)). If the pattern is a second pattern 52, "0" (magenta) is written in a position corresponding to the patterned portion of the M memory 40M (FIG. 6(*c*)). If the pattern is a third pattern 53, "0" (yellow) is written in a position corresponding to the patterned portion of the Y memory 40Y (FIG. 6(*d*)).

Subsequently, the black developing unit 15K (see FIG. 1) is set, and image reading from the K memory 40K is performed. At that time, the second selector 43 is set so as to be able to read the contents of the K memory 40K. The contents of the K memory 40K are subjected to density conversion by the density conversion circuit 48, and the resultant signal is output to the copy unit 5.

The image information output to the copy unit 5 is converted into an optical signal by the exposure control unit 13 to form a latent image on the photosensitive member 14, as described above. The latent image is developed by black toner contained in the black developing unit 15K, the developed image is transferred onto the recording paper 2 by the transfer unit 16, and the transferred image is fixed by the fixing unit 18 to form a black image on the recording paper 2. At that time, the same image as that shown in FIG. 6(*a*) is formed. The recording paper 2 on which the black image is formed passes through the lower conveying unit 28 via the separating mechanism 27, and is conveyed to and stops at the position of the registration roller 20.

Subsequently, the cyan developing unit 15C is set to the predetermined position, and the second selector 43 is set so as to be able to read the contents of the C memory 40C. The contents of the C memory 40C are subjected to density conversion by the density conversion circuit 48, and the resultant signal is output to the copy unit 5. The image information output to the copy unit 5 provides a latent image according to the above-described processing. The latent image is developed by cyan toner contained in the cyan developing unit 15C, the developed image is transferred onto the recording paper 2 stopping at the position of the registration roller 20, and the transferred image is fixed to form a cyan image on the recording paper 2 on which the black image has been formed. At that time, an image obtained by synthesizing the images shown in FIGS. 6(a) and 6(b) is formed on the recording paper 2.

Figure 7:
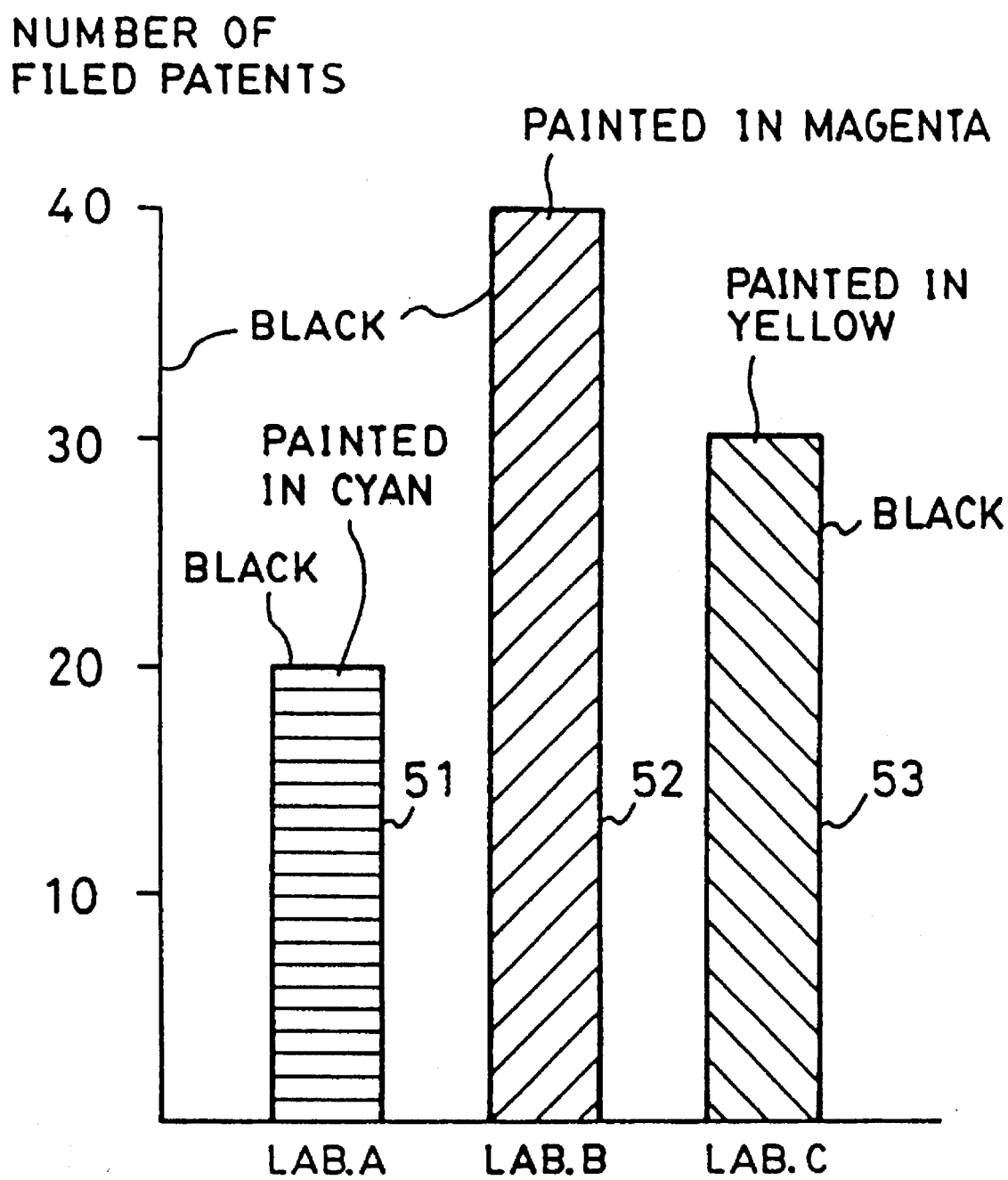
FIG. 7 is a diagram showing an example of recording paper on which an image is formed in the first embodiment.

By forming images in magenta and yellow using the M memory 40M and the Y memory 40Y in the same manner as described above, it is possible to provide a copy in which different colors are painted for patterned portions of the monochromatic original, as shown in FIG. 7. That is, a copy is provided in which desired colors are painted on the surfaces of the first through third image patterns 51–53.

An explanation will now be provided of a second embodiment of the present invention. The second embodiment has the same configuration as that shown in FIGS. 1–4.

Figure 8:
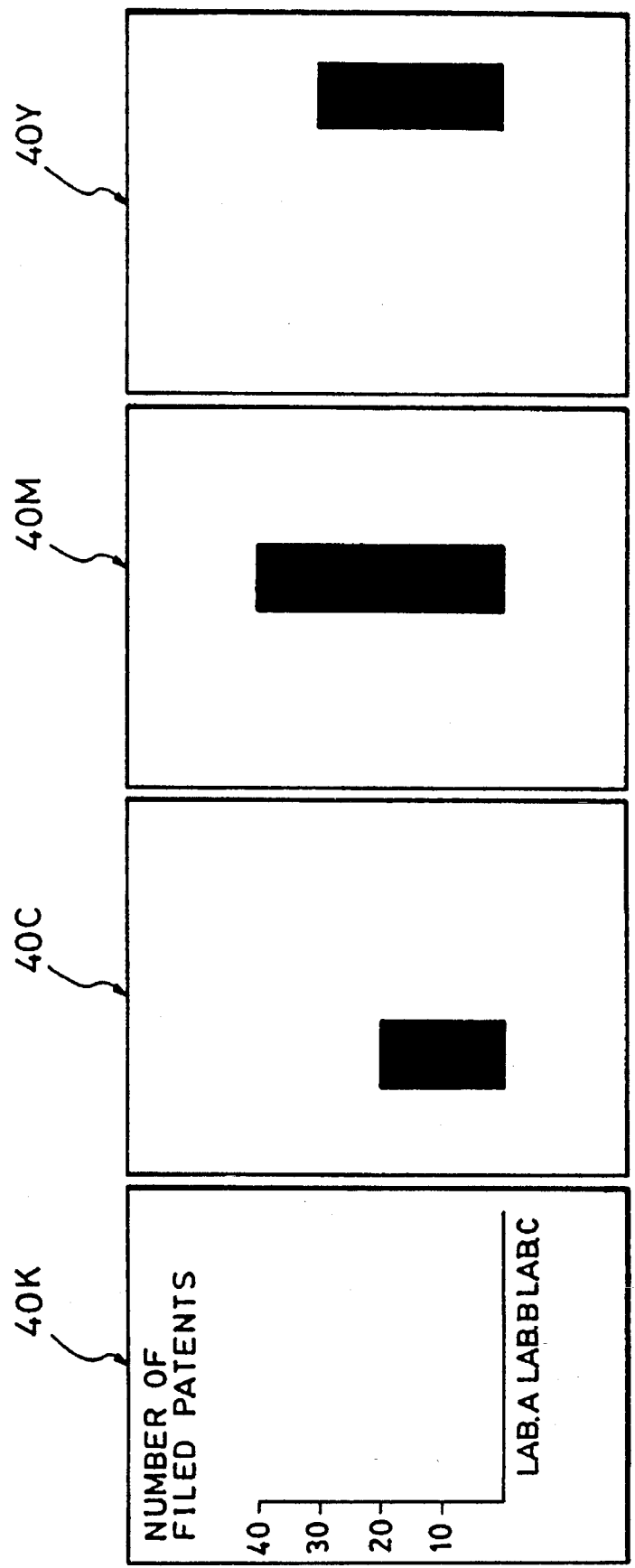
FIGS. 8(a)–8(d) are diagrams showing an example of pattern information and color information stored in a K memory and a color information memory unit of a second embodiment.

In the second embodiment, when a coincident portion between the image information and the image pattern has been detected, the patterned portion within the K memory 40K is rewritten to "1" (white information), as shown in FIG. 8(a). If the pattern is the first pattern 51, "0" (cyan) is written at a position corresponding to the patterned portion in the C memory 40C (FIG. 8(b)), as in the first embodiment. If the pattern is the second pattern 52, "0" (magenta) is written at a position corresponding to the patterned portion in the M memory 40M (FIG. 8(c)). If the pattern is the third pattern 42, "0" (yellow) is written at a position corresponding to the patterned portion in the Y memory 40Y (FIG. 8(d)).

Figure 9:
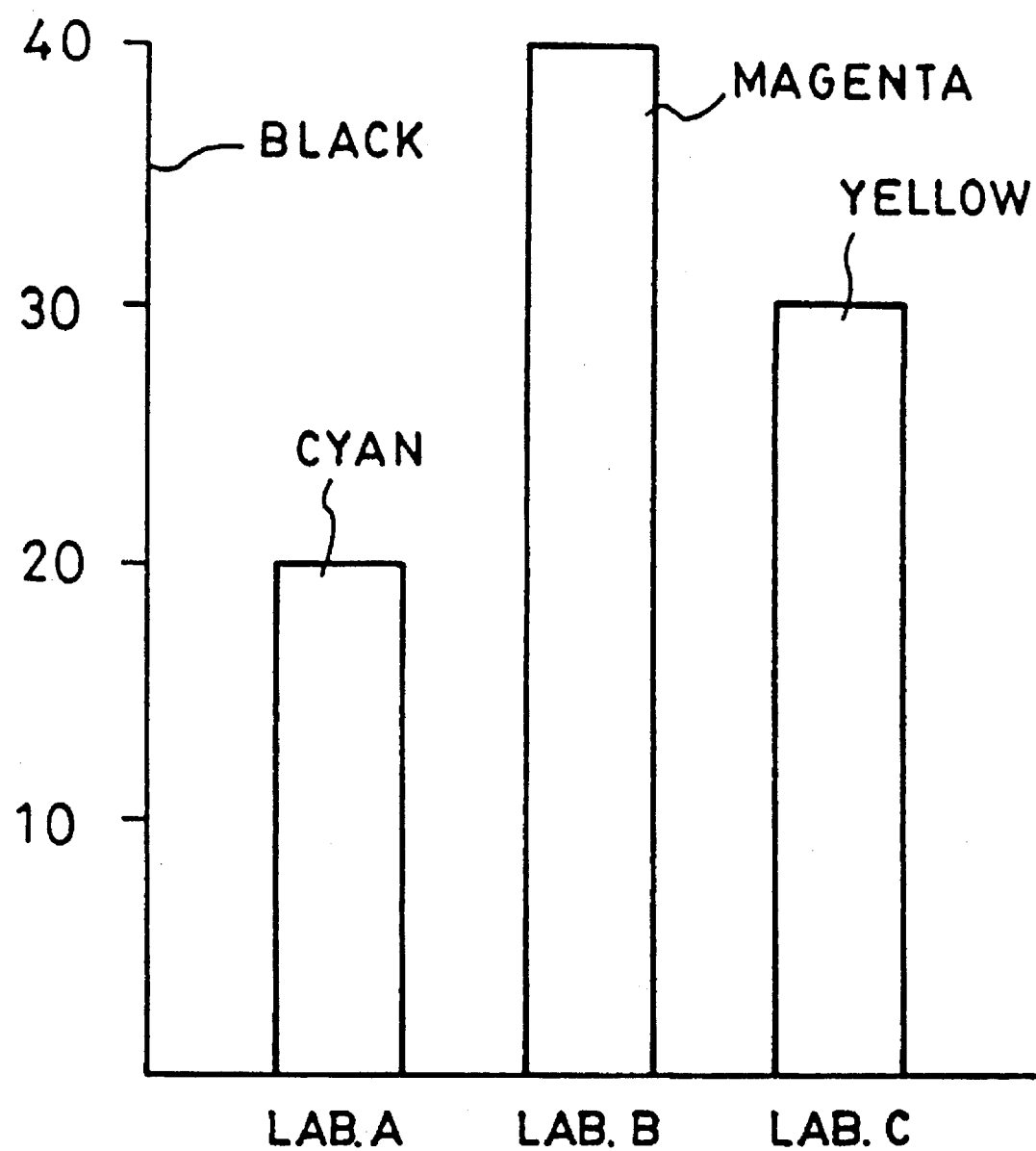
FIG. 9 is a diagram showing an example of recording paper on which an image is formed in the second embodiment.

By performing the same processing as in the first embodiment, images shown in FIGS. 8(a), 8(b), 8(c) and 8(d) are sequentially synthesized, and a multicolor copy shown in FIG. 9 can be obtained from the monochromatic original shown in FIG. 5A.

Next, an explanation will be provided of a third embodiment wherein an image pattern and color information can be registered by operating the operation unit 32 (see FIG. 3).

The user first set the "color setting" mode by depressing the color setting key 36 on the operation unit 32.

Subsequently, a monochromatic original is mounted on a digitizer (not shown), and pattern portions to be colored are sequentially pointed by a pointing pen (not shown). After the completion of pattern pointing, the monochromatic original is mounted on the original-mount glass 8, and the color registration key 35 is depressed.

By the depression of the color registration key 35, the scanner unit 4 moves in the direction of arrow A to sequentially read the original patterned by the pointing pen.

Image information input from the scanner unit 9 to the image sensor 12 is converted into an electrical signal, which is amplified by the amplifier 45 and is input to the A/D converter 46. Subsequently, the image information is converted from an analog signal into a digital signal by the A/D converter 46, and the converted signal is input to the binary-coding circuit 47.

Image patterns assigned by the pointing pen are sequentially stored in the pattern memory 39. That is, the image patterns are stored while forming a table in the pattern memory 39 so as to be output in accordance with the pointing sequence, for example, by making the output of the first pattern 51 "1" when the first pattern 51 first assigned by the pointing pen is input, and making the output of the second pattern 52 "2" when the second pattern 52 subsequently assigned by the pointing pen is input.

Color assignment is performed using the display unit 38 and the ten keys 37 on the operation unit 32. At that time, as shown in FIG. 3, for example, a message "assign the color for the first pattern" is displayed on the display unit 38, and the color for the first pattern 51 is selected by operating the ten keys 37.

In the present embodiment, "1" (cyan) is assigned for the first pattern 51, "2" (magenta) is assigned for the second pattern 52, and "3" (yellow) is assigned for the third pattern 53.

According to the above-described operation, a table of the colors corresponding to the assigned patterns is formed and stored in the RAM region of the memory unit 31.

Subsequently, by performing the same processing as in the second embodiment, a multicolor copy can be obtained from a monochromatic original.

Although, in the above-described third embodiment, color information is registered using the operation unit 32, a control device may be connected to the main body of the apparatus via a connector or the like so as to be able to perform program control of color information.

Figure 10:
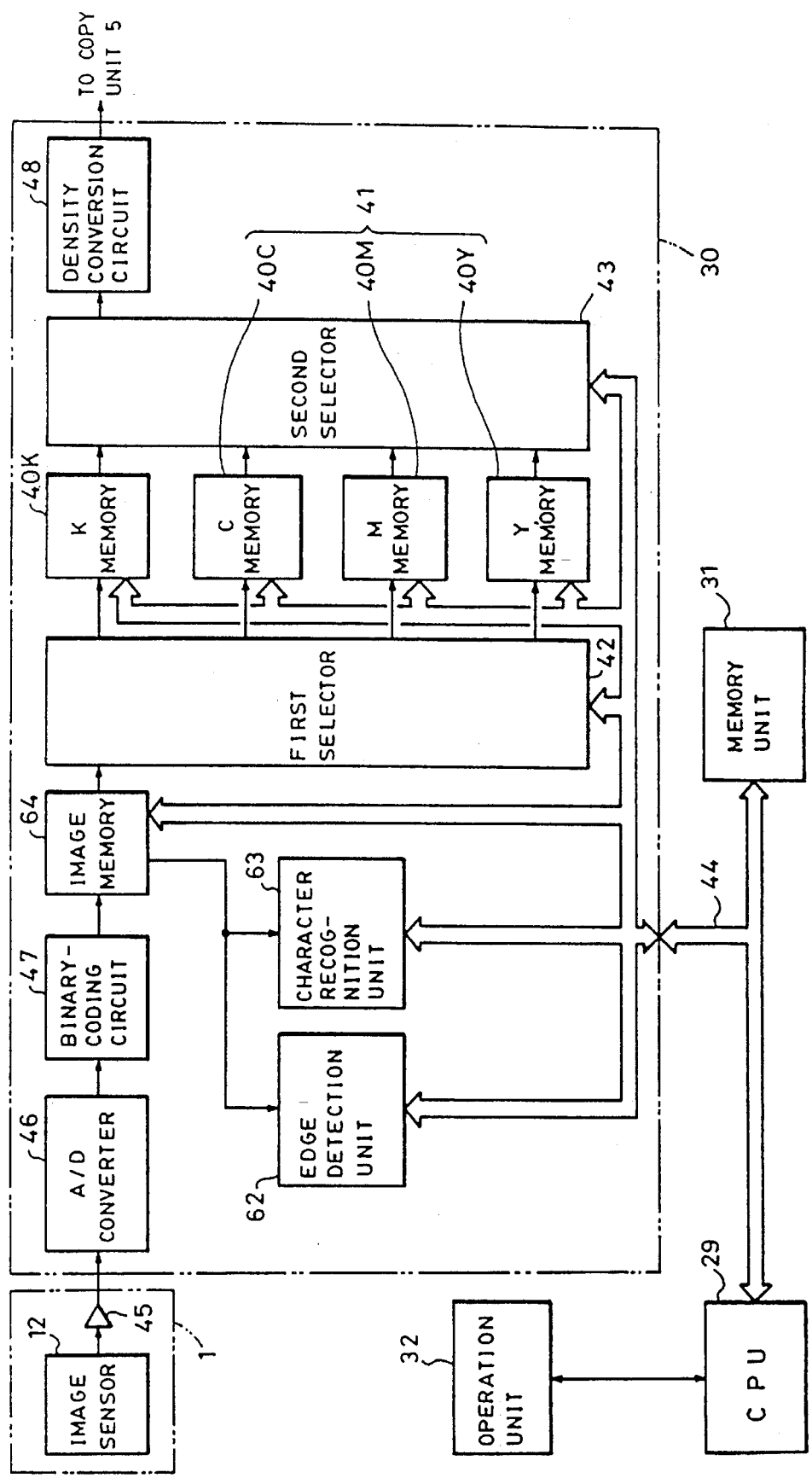
FIG. 10 is a block diagram showing the detail of an image forming apparatus according to a fourth embodiment of the present invention.
Figure 11:
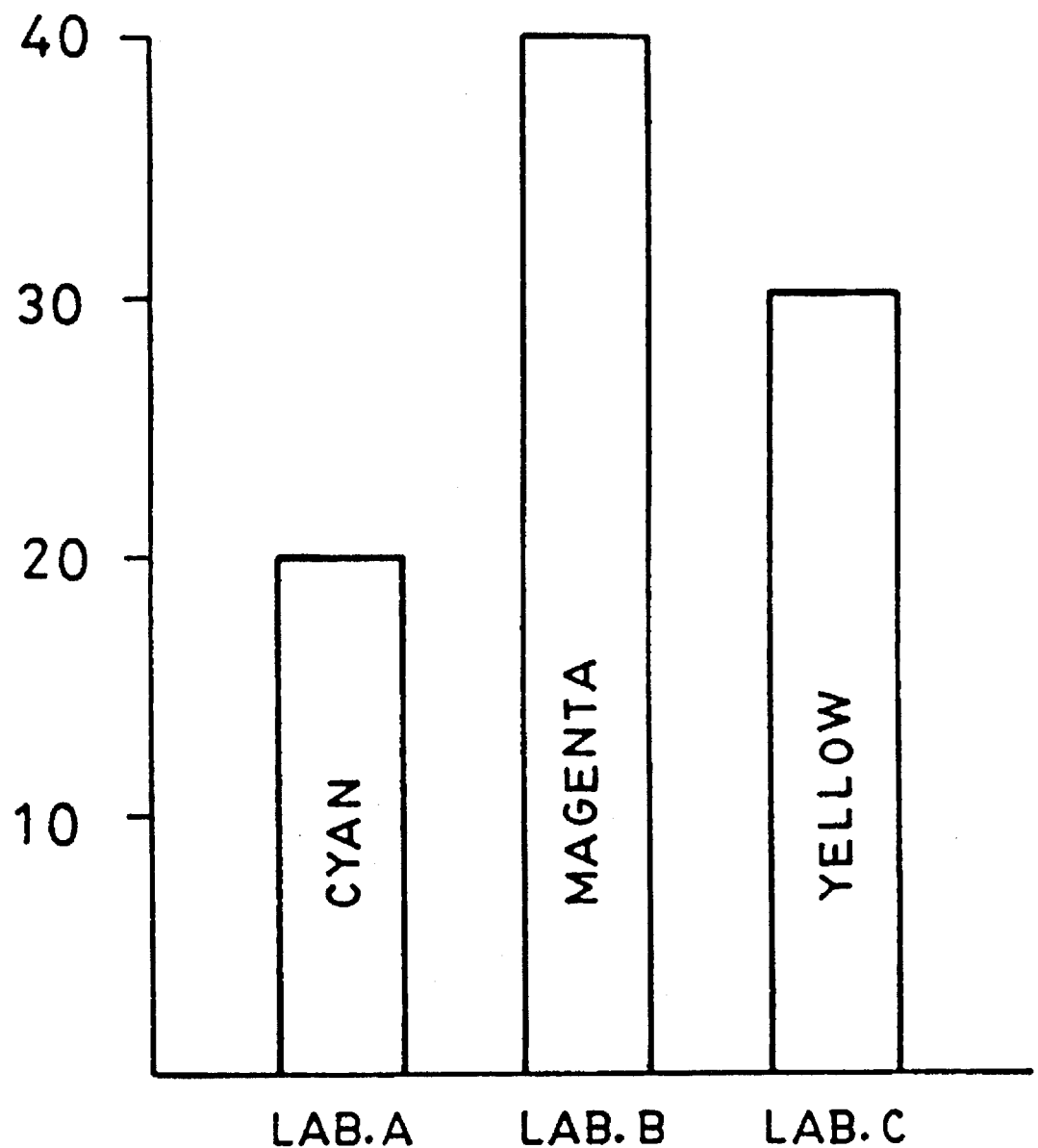
FIG. 11 is a diagram illustrating a monochromatic original used in the fourth embodiment.

Next, an explanation will be provided of a fourth embodiment of the present invention. FIG. 10 is a block diagram showing the detail of the image signal control circuit 30. FIG. 11 is a diagram illustrating an original used in the present embodiment. The original is depicted in monochrome, and the user has written the names of colors in regions to be colored. The image of the original shown in FIG. 11 written by the image information reading unit 1 is converted into a digital signal by the A/D converter 46, is binary-coded by the binary-coding circuit 47, and is stored in the image memory 64. A character recognition unit 63 recognizes characters in the image stored in the image memory 64. An edge detection unit 62 detects a region surrounded by edges in the image. The image memory 64 has a capacity to allow these determinations. The CPU 29 determines the characters recognized by the character recognition unit 63, and checks whether or not the determined characters constitute a word representing a color. If the result of the check is affirmative, the CPU 29 obtains information of the edges surrounding a portion where the characters are present from the edge detection unit 62, and outputs "0" data to one of the K memory 40K, the C memory 40C, the M memory 40M and the Y memory 40Y in accordance with the color so as to paint the region surrounded by the edges by the color expressed by the recognized word. In addition, according to the information of the edges surrounding the above-described portion where the characters are present, image data other than the image data of the region surrounded by the edges are output from the image memory 64 to the K memory 40K via the first selector 42. That is, the character recognition unit 63 recognizes the name of the color "cyan" in the image of the original shown in FIG. 11, and the edge detection unit 62 detects the edges, i.e., the rectangular portion surrounding the name of the color. "0" data is written in the region corresponding to the rectangular portion in the C memory 40C so as to paint the region in cyan, and "1" data are written in other regions. The same processing is also performed for the names of colors "magenta" and "yellow". Image data for regions other than the rectangular regions surrounding the names of colors "cyan", "magenta" and "yellow" stored in the image memory 64 are written in the K memory 40K. Image data stored in the K memory 40K, the C memory 40C, the M memory 40M and the Y memory 40Y are output to the copy unit 5 in the same manner as in the above-described embodiments. FIG. 9 shows an image thus output.

According to the present embodiment, it becomes possible to obtain a copy in which an image of an original is subjected to coloring processing by merely writing the names of colors in portions to be colored by the user, and therefore to easily and promptly perform coloring processing.

Figure 12:
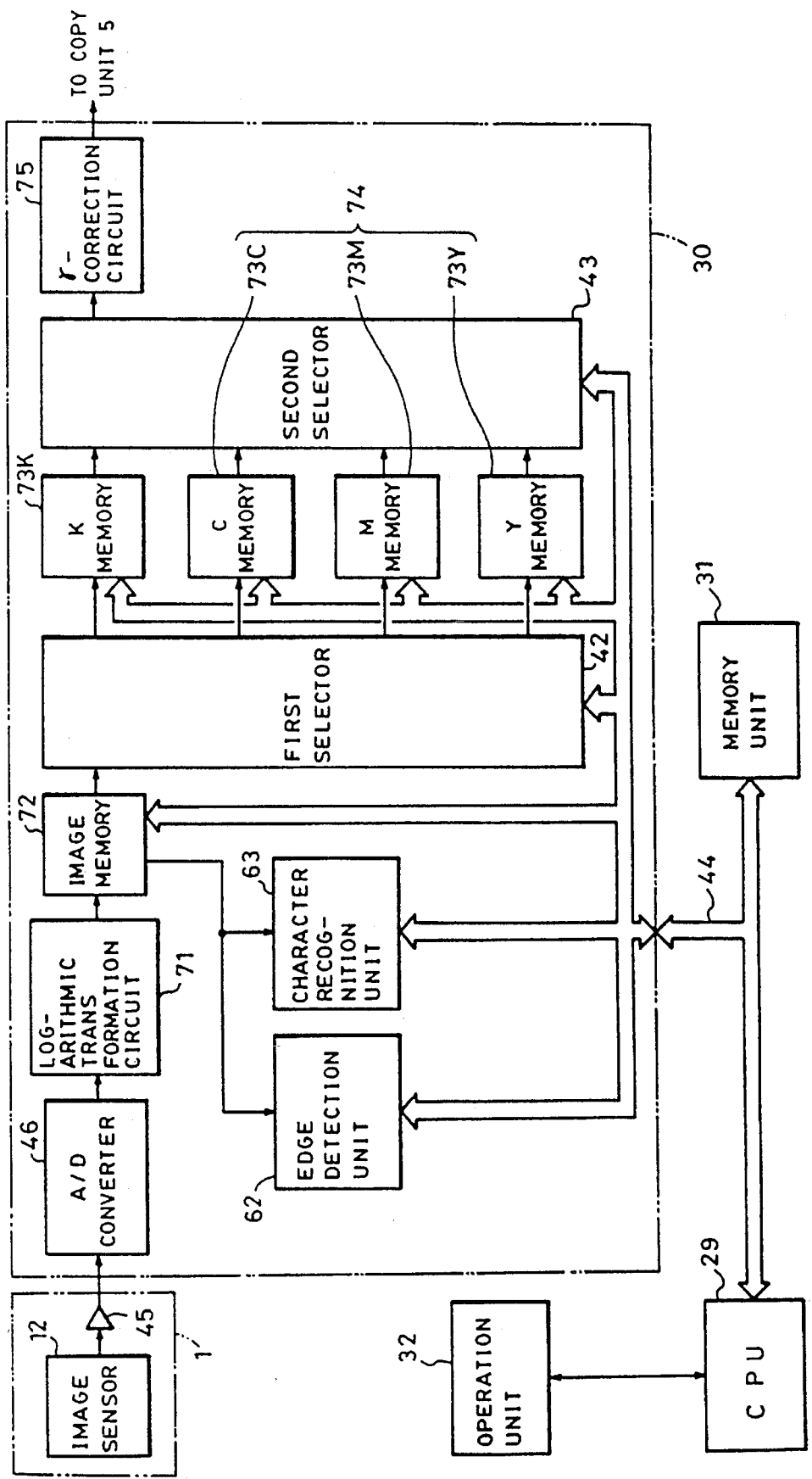
FIG. 12 is a block diagram of a modification of the fourth embodiment.

In the present embodiment, a binary-coded image is output. However, as shown in FIG. 12, if an image memory 72, a K memory 73K, a C memory 73C, an M memory 73M and a Y memory 73Y for storing multivalue data are provided, it is possible to output various colors, and therefore to obtain a beautiful image. In this embodiment, a logarithmic transformation circuit 71 converts a digital value indicating luminance from the A/D converter 46 into a digital value indicating density, and stores the converted value in the image memory 72. In this circuitry for converting luminance data into density data, the CPU 29 writes "1" data in regions to be colored. In the present circuitry for dealing with multi-value data, a δ-correction circuit 75 performs δ-correction in accordance with the characteristics of the copy unit 5.

Although in the above-described embodiments, an explanation has been provided of an electrophotographic printer as an image forming unit, the present invention is not limited to such a printer. A video printer, a thermal transfer printer, an ink-jet printer, a plotter, a bubble-jet printer in which air bubbles are generated in ink by heat and the ink is discharged onto a sheet by the pressure of the air bubbles, or the like may be used.

Although, in the above-described embodiments, a copy is printed in three colors using three color developing units, it is also possible to provide various colors by changing the ratios of development by the respective developing units, and to paint a copy in colors corresponding to patterns other than the colors described in the embodiments.

Although, in the above-described embodiments, a processed image is output by a printer, image data containing color information after processing may be transmitted, or the image may be displayed on a display.

As explained above, according to the present invention, it is possible to synthesize color information with image information by a simple operation.

What is claimed is:

1. An image processing apparatus, comprising:

image input means for inputting monochromatic image information;

memory means for storing a pattern image including a repeated pattern;

recognition means for recognizing a pattern image in the monochromatic image information by comparing the input monochromatic image information with the pattern image stored in said memory means;

synthesizing means for synthesizing a color in the region of the pattern image in the monochromatic image information according to the pattern image recognized by said recognition means; and output means for outputting image information synthesized by said synthesizing means.

2. An image processing apparatus, comprising:

image input means for inputting image information;

memory means for storing a pattern image including a repeated pattern;

comparison means for comparing the image information from said image input means with the pattern image stored in said memory means so as to discriminate whether the image information coincides with the pattern image;

first image forming means for performing image formation of the image information in a first color on a recording medium; and second image forming means for performing image formation in a second color on a region on the recording medium for which said comparison means discriminates that the image information coincides with the pattern image stored in said memory means.

3. An image processing apparatus according to claim 2, wherein said second image forming means paints the second color in the region.

4. An image processing apparatus, comprising:

image input means for inputting image information;

memory means for storing a plurality of pattern images each respectively including a repeated pattern;

comparison means for comparing the image information from said image input means with the plurality of pattern images stored in said memory means so as to discriminate whether the image information coincides with any one of the pattern images;

first image forming means for performing image formation of the image information of a first region, for which comparison means discriminates that the image information does not coincide with any of the plurality of pattern images, in a first color on a recording medium; and second image forming means for performing image formation in a second color on a second region on the recording medium for which said comparison means discriminates that the image information coincides with one of the plurality of pattern images.

5. An image processing apparatus according to claim 4, wherein said second image forming means paints the second color in the second region.

6. An image processing apparatus according to claim 2 or 4, wherein said first image forming means and said second image forming means perform image formation on the same recording medium.

7. An image processing apparatus according to claim 2 or 4, further comprising pattern registration means for registering the plurality of pattern images, and wherein said comparison means compares the plurality of predetermined patterns registered by said pattern registration means with the image information.

8. An image processing apparatus according to claim 2 or 4, wherein said second image forming means performs image formation in a third color and a fourth color, wherein image formation is performed in the third color in a third region where said image information coincides with a second one of the plurality of pattern pages, and wherein image formation is performed in the fourth color in a fourth region where said image information coincides with a third one of the plurality of predetermined patterns.

9. An image processing apparatus according to claim 8, further comprising means for setting a corresponding relationship between the plurality of pattern images and the first, second, third and fourth colors.

10. An image processing apparatus according to claim 2 or 4, wherein said image input means comprises a reader for reading an image of an original, and wherein said first and second image forming means comprise printers.

11. An image processing method comprising the steps of:

inputting monochromatic image information;

recognizing a pattern image including a repeated pattern in the monochromatic image information by comparing the input monochromatic image information with a previously-stored pattern image;

synthesizing a color in the region of the recognized pattern image in the monochromatic image information; and outputting synthesized image information.

12. An image processing method, comprising the steps of:

inputting image information;

comparing the image information from image input means with a previously-stored pattern image which includes a repeated pattern so as to discriminate that the image information coincides with the previously-stored pattern image;

performing image formation of the image information in a first color on a recording medium; and performing image formation in a second color on a region on the recording medium for which said comparing step discriminates that the image information coincides with the previously-stored pattern image.

13. An image processing method, comprising the steps of:

inputting image information;

comparing the image information from image input means with a plurality of kinds of pattern images, each of which respectively includes a repeated pattern so as to discriminate whether the image information coincides with any one of the pattern images;

performing image formation of the image information of a first region, for which said comparing step discriminates that the image information does not coincide with any of the plurality of pattern images, in a first color on a recording medium; and performing image formation in a second color on a second region on the recording medium for which said comparing step discriminates that the image information coincides with one of the plurality of pattern images.

14. An image processing apparatus, comprising:

input means for inputting monochromatic image information;

recognition means for recognizing a pattern image including a repeated pattern;

painting means for painting a region for which said recognition means recognizes the pattern image in the image information inputted by said input means; and output means for outputting an image information painted by said painting means.

15. An image processing apparatus according to claim 14, wherein said painting means performs painting in a color corresponding to the pattern image.

16. An image processing apparatus according to claim 14, wherein said input means is a reader and said output means is a printer.

17. An image processing apparatus according to claim 14, wherein said painting means does not paint the region which is not the pattern image.

18. An image processing apparatus, comprising:

input means for inputting monochromatic image information;

recognition means for recognizing a pattern image including a repeated pattern;

conversion means for converting the pattern image recognized by said recognition means into a painted color image; and output means for outputting image information converted by said conversion means.

19. An image processing apparatus according to claim 18, wherein said conversion means converts the pattern image into a color image painted in a color corresponding to the pattern image.

20. An image processing apparatus according to claim 18, wherein said input means is a reader and said output means is a printer.

21. An image processing apparatus according to claim 18, wherein said conversion means does not convert a region which is not the pattern image.

22. An image processing method, comprising the steps of:

inputting monochromatic image information;

recognizing a pattern image including a repeated pattern in the monochromatic image information;

painting a region for which said recognizing step recognizes the pattern image in the monochromatic image information; and outputting a painted image information.

23. An image processing method according to claim 22, wherein a color corresponding to the pattern image is painted in said painting step.

24. An image processing method according to claim 22, wherein a region which is not the pattern image is not painted in said painting step.

25. An image processing method, comprising the steps of:

inputting monochromatic image information;

recognizing a pattern image including a repeated pattern in the monochromatic image information;

converting the pattern image into a painted color image; and outputting converted image information.

26. An image processing method according to claim 25, wherein the pattern image is converted into a color image painted in a color corresponding to the pattern image in said conversion step.

27. An image processing method according to claim 25, wherein the region which is not the pattern image is not converted in said converting step.

* * * * *

UNITED STATES PATENT AND TRADEMARK OFFICE
CERTIFICATE OF CORRECTION

PATENT NO. : 5,552,903
DATED : September 3, 1996
INVENTOR(S) : Masanori Sakai, et al.

It is certified that error appears in the above-indentified patent and that said Letters Patent is hereby corrected as shown below:

TITLE PAGE:

[30] "128364" should be --3-128364--.

COLUMN 1:

Line 23, "he" should be --be--.

COLUMN 10:

Line 36, "predetermined" should be deleted;
Line 37, "patterns" should be --pattern images--; and
Line 47, "predetermined patterns." should be
    --pattern images.--.

Signed and Sealed this

Eighteenth Day of February, 1997

Attest:

Attesting Officer

BRUCE LEHMAN

Commissioner of Patents and Trademarks